March 6, 1962 — M. E. McLAIN, JR., ET AL — 3,024,172
ELECTROLYTIC SEPARATION PROCESS AND APPARATUS
Filed March 15, 1960
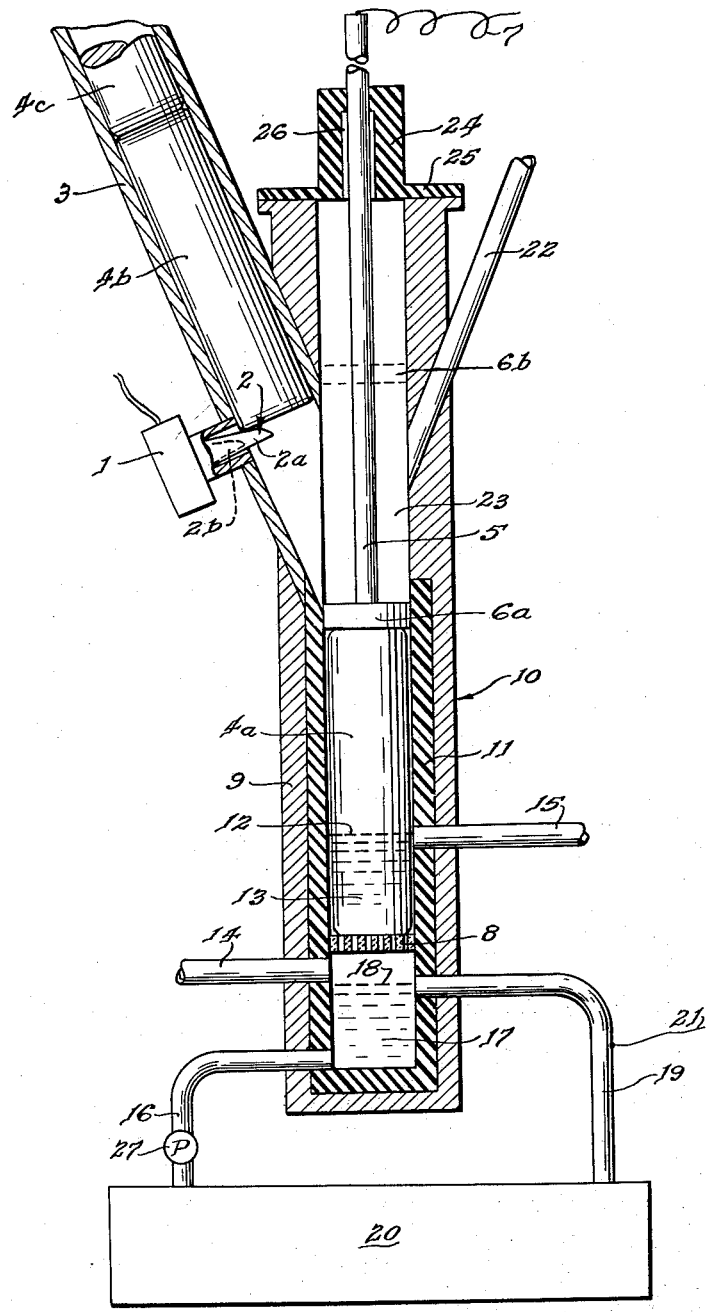
INVENTORS
Milton E. McLain, Jr.
Morris W. Roberts
BY
Roland A. Anderson
Attorney

United States Patent Office 3,024,172
Patented Mar. 6, 1962

3,024,172
ELECTROLYTIC SEPARATION PROCESS AND APPARATUS
Milton E. McLain, Jr., Buford, Ga., and Morris W. Roberts, Idaho Falls, Idaho, assignors to the United States of America as represented by the United States Atomic Energy Commission
Filed Mar. 15, 1960, Ser. No. 15,248
7 Claims. (Cl. 204—1.5)

The invention relates to a novel method for substantially separating the structural metal components of nuclear reactor elements including fuel and blanket elements from the fissile, fertile, transmutation, and fission product components; more particularly of separating the iron, nickel, chromium, molybdenum, tungsten, copper, and tin used for cladding, alloying and dispersion purposes in such elements, from the uranium, plutonium, thorium, other actinides, and the bulk of the fission products, which are found in the elements after a period of neutron irradiation within such reactors, and to novel apparatus for carrying out the method of separation.

In certain recently developed types of nuclear reactors, stainless steel, Nichrome and other similar alloys containing iron, nickel, chromium, molybdenum, tungsten, copper, and tin are extensively employed. One of their uses is that of cladding the fuel and blanket elements in conventional "can" fashion; for certain "fast" reactors these metals are melted with uranium in certain proportions to make metallic fuel elements, and "composite" fuel elements are formed by dispersing oxide fuels such as $UO_2$ throughout a body of an alloy of the kind mentioned, which serves as a matrix; and both the metallic and the composite elements may be, and usually are, canned with such alloys as well.

The repossessing of such nuclear reactor elements, including fuel and blanket elements, after a period of service in a reactor, presents problems not encountered in the more familiar reprocessing of fuel elements which have been canned in aluminum alloys. Aluminum and the light elements with which it is commonly alloyed such as magnesium dissolve with comparative ease in several aqueous mineral acids, and after they have been brought into solution they can be selectively separated from the actinides and fission products present in the solution without too much difficulty by several methods which are known to the art. The heavier metals with which the present invention is concerned, iron, nickel, chromium, molybdenum, tungsten, copper, and tin, are, with the possible exception of iron, much more difficult to dissolve, and all are far more difficult to remove selectively from solution than is aluminum and its alloying metals. Although iron dissolves rather readily, acids with the extremely high normalities of 6 to 8 are needed to treat the other metals of the alloys and make sure that dissolution is complete. This, of course, makes it impossible to use stainless steel for the handling equipment for the radioactive solution, which would otherwise be desirable on account of its strength and reliability. The use of glass, for example, for this purpose leads to the possibility of a vessel or pipeline breaking and the escape of a large amount of dangerously radioactive fluid.

Many methods of selective removal of iron, nickel, chromium, molybdenum, tungsten, copper, and tin have been tried such as solvent extraction, ion exchange, precipitation, coprecipitation and the like, but all fail to give satisfactory results in one of two ways; either they fail to remove all the values of these metals, or if they do this, they bring along with them unacceptable amounts of fission product values with their dangerous radioactivity.

In either case the problem of separation remains unsolved. If the removal of structural metals falls substantially short of being complete the radioactive waste solution, which will have to be stored after the fuel values and other valuable components have been removed, will be made bulkier by the presence of nonradioactive components and consequently require more space and expensive shielding. On the other hand, if the nonradioactive components are substantially removed but their removal includes actinides and substantial amounts of fission products all that has been accomplished is the creation of a second radioactive mass to be dealt with, and the suitation is actually worse than ever.

It is, therefore, an object of the invention to provide a simple, economical method of bringing structural metals of nuclear reactors into solution more easily than can be done at present, and to selectively remove them therefrom.

It is a further object of the invention that such selective removal shall not include any substantial amounts of radioactive actinides, or fission products resulting from a nuclear reaction.

It is a further object of the invention that such selective removal shall be substantially complete.

It is a further object of the invention to provide an easy, economical method of dissolving metals of the group consisting of iron, nickel, chromium, molybdenum, tungsten, copper, and tin and selectively and substantially separating their values from actinide and fission product values in aqueous solutions.

It is a further object of the invention to provide a method for the reduction of the volume of radioactive waste solutions resulting from the dissolving by aqueous solvents of nuclear reactor elements after a period of operation in nuclear reactors by substantially removing therefrom nonradioactive structural metal values.

It is a further object of the invention to provide such a method for such reduction where the nuclear reactor elements include a member or members of the group consisting of iron, nickel, chromium, molybdenum, tungsten, copper, and tin as cladding or alloying metal, or as a matrix for an oxide fuel dispersion.

It is a further object to provide a method for separating structural metal values from such radioactive solutions which may be carried out with sufficiently dilute acid so as to allow the use of stainless steel circulating equipment, thereby increasing the safety of such operations.

All the foregoing objects are attained by our discovery that fuel and blanket elements, including the structutral metals iron, nickel, chromium, molybdenum, tungsten, copper, and tin, may be easily brought into solution by electrolysis at certain current densities in an aqueous acid which would otherwise be too dilute to dissolve the elements completely, and that the structural metals named may be substantially selectively removed from the solution at the same current densities by a flowing mercury cathode which will selectively reduce the structural metals to the metallic state and absorb them, including even the iron and nickel which, though insoluble in merecury, form a finely divided suspension in the mercury. The mercury may then be circulated out of the electrolysis cell and continuously stripped of the structural metal values with only minor and quite acceptable amounts of fission products entrained with them, the great bulk of the fission products and all the actinide fuel, fissile and transmutation values remaining in the aqueous solution. The aqueous solution may also be circulated out of the cell, continuously stripped of these values and returned to the cell, whereby a continuous, economical separation method of the structural metals may be carried out.

Attention is now directed to the FIGURE which is a semi-schematic sectional representation of an apparatus for carrying out the invention. Solenoid 1 holds control arm 2 in position 2a so as to retain fuel or blanket elements 4b and 4c awaiting processing in holding chute 3. Element 4a which was formerly in the lowest position in chute 3, now occupied by element 4b, was admitted to its present processing position by the upward retraction of piston rod 5 until piston head 6a was in position 6b shown by dotted lines, and arm 2a was moved by solenoid 1 into position 2b for a sufficient time for gravity to move element 4a from the position in chute 3, now occupied by element 4b, into the processing position shown in the figure. Flexible wire 7 delivers direct current from a source (not shown) into metallic piston rod 5 which conducts the current through piston head 6a into element 4a which is the anode, or positive electrode, of the cell. Element 4a rests on porous, ionically conductive, ceramic barrier 8 insulated by nonporous ceramic liner 11 from the stainless steel wall 9 of the electrolytic cell, indicated generally by the arrow headed lead line 10. Element 4a is immersed up to level 12 in aqueous acid electrolyte 13 which is circulated through cell 10 by means of electrolyte inlet tube 14 entering cell 10 beneath ceramic barrier 8, and leaves cell 10 by means of electrolyte outlet tube 15, carrying with it the dissolved fission product values, the uranium 235 and 233 fuel values, thorium and uranium 238 fissile values, and the plutonium, americium, curium, and other transmutation values. The amounts of these depend, of course, on the make-up of the reactor core at the start of the period of operation, the length of the period of operation, and whether the elements being reprocessed are fuel elements or blanket elements. The terms fuel and blanket elements are virtually interchangeable for purposes of the present application, since while their functions are quite different within reactors, the chemical reprocessing of both types of elements after their withdrawal from reactors is essentially the same. Electrolyte outlet tube 15 leads to a stripping means (not shown) whereby through solvent extraction, ion exchange or other techniques known to the art the electrolyte solution 13 is stripped of the fission product and actinide values and then by a pumping means is returned to cell 10 through electrolyte inlet tube 14.

Mercury is admitted through mercury inlet tube 16 into cathode compartment 17 in which the cations of the dissolved structural metals iron, nickel, chromium, molybdenum, tungsten, copper, and tin are attracted to cathode 17 and on coming into contact therewith are reduced to the metallic state whereupon the chromium, molybdenum, tungsten, copper, and tin amalgamate with the mercury and the iron and nickel, although insoluble in mercury, form a finely divided suspension that enables the mercury to carry them out of the cell through mercury outlet tube 19 as completely as if they amalgamated like the other metals. The fission products ruthenium, rhodium, and other noble metals are likewise reduced at the cathode, but as will be shown later these do not constitute a serious drawback to the invention even in their naturally occurring amounts, and in addition, their reduction and amalgamation by the mercury may be suppressed if that is deemed necessary. In any event the mercury circulates generally upward in the cathode compartment 17 to the level 18 where it makes an interface with the aqueous electrolyte 13 even with the top of the mercury outlet tube 19 which leads to mercury stripping means 20, the details of which are not shown, but which may be a distillation device, a denuding wash device, or an air sparging and filtration device whereby the metals are converted to oxides and filtered out. These alternative methods of stripping the metals from the mercury are not a part of the invention and are known to the art; following the stripping the mercury is circulated by a pumping means 27 into mercury inlet tube 16. As the electrolysis proceeds the fuel element 4a is consumed at the bottom so that the top sinks lower into the cell 10, followed by piston head 6a which bears continually against it due to gravity, either alone or in combination with a biasing device such as a spring (not shown). The process may be continued until fuel element or blanket element 4a is completely consumed, provided that piston rod 5 and piston head 6 are made of metal sufficiently inert to withstand corrosion by electrolyte 13; in case less expensive metals are used the downward course of piston head 6a may be stopped short of electrolyte level 12, the piston head retracted upwardly to position 6b, the control arm 2 moved by solenoid 1 to position 2b shown by the dotted lines, whereupon fuel or blanket element 4b will slide by gravity out of holding chute 3 into cell 10, with its bottom resting on the top of the undissolved top portion of fuel or blanket element 4a. Solenoid 1 then returns control arm 2 to the position 2a in time to hold element 4c in the bottom position in holding chute 3, and piston rod 5 is lowered until piston head 6 is in firm contact with the top of element 4b, thereby making an electrical contact through element 4b into the undissolved remaining portion of element 4a, and through the latter into electrolyte 13. Since ionic diffusion takes place freely through porous barrier 8, electrical contact becomes complete through electrolyte 13 between piston head 6 and flowing mercury cathode 17 which is, of course, the negative electrode of the cell. Wire 21, in electrical contact with mercury outlet pipeline, which is of steel or other conductive metal, leads to the current source already mentioned as not shown to which wire 7 also leads, thus completing an electrical circuit. The direction of the current in the circuit is generally counterclockwise in the conventional sense, the direction of the flow of electrons being clockwise. Offgas line 22 leads from space 23 above cell 10 to conduct away the gases created by the electrolysis, some of which are radioactive and are treated in the manner known to the art. Insulating cover 24, provided with flange 25, bolted to wall 9, and packing 26, prevents escape of gas in any other way than through offgas line 22. Holding chute 3 is also made gas-tight at its upper end (not shown).

Numerous modifications of the apparatus described in connection with the figure may be made. For example, if piston head 6 is made of metals such as niobium, tantalum, tungsten, titanium or alloys thereof, which show the electrolytic valve effect, alternating current may be used in the circuit and it will be rectified to direct current at the interface between piston head 6 and the fuel or blanket element being processed. Another modification is to eliminate barrier 8 entirely and substitute for piston head 6 a welding electrode, preferably a three fingered welding electrode; before a fuel or blanket element comes down from holding chute 3, the electrolyte is led from the cell 10 and the mercury permitted to remain; when the element falls into cell 10 from the chute it will rest on the bottom of cathode compartment surrounded part way up its length by mercury; the three fingered welding electrode is then lowered until it comes into contact with the top of the fuel or blanket element and a welding current is passed until it is firmly welded to the three fingered electrode; the electrode with the element adhering to it is then retracted upward until the bottom of the element is above level 18 of the mercury, the electrolyte 13 is then admitted to cell 10 and the electrolysis proceeds without barrier 8, the element being lowered gradually as it is consumed, but always kept out of direct contact with the mercury. Another variation is to have the flowing mercury cathode surround the fuel or blanket element cylindrically, rather than to have it beneath the bottom of the element as in the figure; this can be done by surrounding the element with a cylindrical piece of metal which does not amalgamate such as stainless steel, and then trickling mercury down its inside as from an annular perforated trough above it. Many other such minor variations will occur to those skilled in the electrolytic cell construction art.

In carrying out our invention we have found a current density in the vicinity of 1 ampere per square centimeter to give good results, although this, of course, might not apply when processing elements from types of reactors which may be developed in the future. If and when plutonium reactors, uranium 233 reactors, or americium reactors are developed the nature of the fission products may make some other current density necessary, but this will not affect the general operation of our invention which may be carried out at any current density necessary to separate the structural metals from the actinide and fission product values based on our discovery that the structural metals iron, nickel, chromium, molybdenum, tungsten, copper, and tin occupy a discrete and surprisingly compact band of the electrolysis spectrum which is overlapped only by that of a few of the noble metal fission products. Our preferred current density calls for a potential of about six volts between the fuel or blanket element anode and the mercury cathode with an electrolyte of about .5 N sulfuric acid. This is our preferred normality and our preferred acid; of course if the normality were greater or another acid were used, or if the electrolyte contained any additive ions for reasons that will be explained later the solution would become more ionically conductive and a smaller voltage would maintain the preferred current density; however, these are all to be considered operating details that will be readily apparent once our discovery of the discrete, compact electrolysis spectrum above mentioned becomes known.

Any mineral acid such as sulfuric, hydrochloric, nitric and the like may be used in carrying out our invention but we prefer sulfuric acid to other acids as the acid component of the electrolyte since hydrochloric acid is more destructive to stainless steel, and nitric acid tends to decompose under electrolysis. The concentration of the acid component may be very great, as high as 6 or 8 N so far as the electrolysis is concerned, but since it is better to use stainless steel circulating equipment for safety reasons lower concentrations of acid are advisable. Our preferred concentration and acid is 0.5 N sulfuric acid, which, while not absolutely inert to stainless steel, acts upon it very slowly, and the amount of its corrosion is quite acceptable in the present situation where safe, reliable containment of the radioactive fluids concerned is a matter of great importance, affecting, in fact, the health of entire communities.

In addition to the acid component of the electrolyte, or reagent as it is sometimes called, the incoming aqueous solution to the electrolytic cell may also contain dissolved salts of the structural metals, it being unnecessary and impossible to conduct the electrolysis so as to keep these entirely out of the solution. In general the concentrations of these tend to find an equilibrium value in any given situation without the need for any deliberate measures to regulate them; they will vary, of course, with the kind and the normality of the acid used, the amounts of the metals in the fuel or blanket elements and other conditions, but will stay within limits where they will cause no salting out or other undesirable side effects. With our preferred acid, 0.5 N $H_2SO_4$, when stainless steel fuel elements of the kind currently in use are being reprocessed, the cation concentrations of Fe, Ni, and Cr will be in the vicinity of 80 grams per liter, 8.7 grams per liter, and 19.5 grams per liter, respectively.

We now wish to make an explanation of the effect of the noble metal fission products, ruthenium in the main, and also rhodium and some others, which are reduced in the electrolysis along with the iron, nickel, chromium, molybdenum, tungsten, copper, and tin, These are radioactive, but none of their radioactivities are of the long-lived and dangerous character of those of strontium 90 and cesium 137, which, fortunately, remain in the aqueous solution along with the great bulk of other radioactive materials. So far as we are able to foresee there will be no valid objection simply to storing the metals separated by our invention until the radioactivities of the noble metals entrained with them decay to a safe level. However, should future developments prove us to be mistaken in this particular, there is a very simple means of reducing the entrainment of the noble metals to extremely low levels; salts of the same nonradioactive metals may be added to the electrolyte and then the reduction at the cathode of the radioactive cations will be inversely proportional to the preponderance of the nonradioactive cations in the electrolyte. Since the radioactive cations are present in only very small quantities to begin with, it is easy to make the preponderance mentioned very great without loading the solution with added ions to any harmful extent. Preferably the salt should have not only the same cation as the noble metal whose entrainment is sought to be suppressed but also the same anion as the acid of the electrolyte; for our preferred 0.5 N sulfuric acid electrolyte the preferred additive is ruthenium sulfate; about 0.1 M of the latter does not affect the operation of the electrolytic cell other than requiring a slight reduction of voltage to maintain the current density, and it suppresses the plating out of radioactive ruthenium to the vanishing point.

Our invention is preferably not to be carried out until at least thirty days have elapsed after the fuel or blanket elements have been removed from the reactor. This is to permit the radioactive molybdenum, which is one of the fission products, to decay substantially completely; otherwise it would be reduced at the cathode of the electrolytic cell and the nonradioactive structural metals would be seriously contaminated.

There is a slight difference in the operation of our invention when the uranium and other actinides are present in the fuel or blanket elements not as metal, which dissolves in the aqueous solvent, but in oxide form as in "composite" or dispersion elements. In the latter case the electrolysis does not dissolve the $UO_2$, $PuO_2$ or other oxide, but they go into a fine suspension in the electrolyte, which gives no difficulty when the electrolyte is led off from the electrolytic cell, and is easily filtered out. This makes for a convenient separation of the actinides from the fission products since they go into solution in the usual way, and otherwise the manner of carrying out our invention is unaffected.

*Example I*

A reprocessing was carried out in the apparatus shown in the figure on all-metallic spent fuel elements of uranium metal clad in stainless steel, having the following composition: 66.6% Fe, 7.2% Ni, 16.2% Cr, and the balance U and its fission and transmutation products. The fuel elements were fed into the electrolytic cell at the rate of 13.3 grams per hour. An aqueous electrolyte was circulated through the cell at the rate of 111 ml. per hour, its composition being 0.5 N in $H_2SO_4$ and 2.61 M in sulfate salts of Fe, Ni, and Cr, the amounts of the latter stated in terms of the weight of the cations only being Fe 80 g./l., Ni 8.7 g./l. and Cr 19.5 g./l. The interface of the flowing mercury cathode and the electrolyte was 20 square centimeters and an electrical current of 20 amperes was passed between this and the fuel elements. The rate of circulation of the mercury was 1197 ml./hr. and the suspension resulting from the electrolysis after leaving the cell was analyzed and found to contain 7.40 g./l. of Fe, 0.97 g./l. of Ni, and 2.11 g./l. of Cr and substantially no uranium or fission products. The mercury was treated with a denuding wash of 2 N $H_2SO_4$ and 2 N $HNO_3$ at the rate of 1772 ml./hr., after which the aqueous waste resulting therefrom was analyzed and found to contain 5.00 g./l. Fe, 0.54 g./l. Ni, 1.22 g./l. Cr, and to be 1.64 N in $H_2SO_4$ and 2 N in $HNO_3$ and substantially free from fission products. The electrolyte, or reagent, from the outlet tube was stripped by ion exchange until its values above set forth were restored. The residual amounts of ions left in the mercury and in the reagent or electrolyte did no harm, and both were recirculated after the strippings mentioned with good results, sulfuric acid being added to the reagent continuously to maintain the acid normality of 0.5 as it entered the cell.

*Example II*

Spent fuel elements having uranium dioxide dispersed in a matrix of stainless steel and clad with stainless steel with an otherwise identical composition as those in Example I were processed in a manner in all respects identical with Example I except that the $UO_2$ was filtered out of the aqueous solution after passing through the electrolytic cell and weighed. All results of the process were identical with those in Example I, and, in addition, $UO_2$ was recovered in the filter at the rate of 1.5 g./hr.

It will be understood that this invention is not to be limited to the details given herein but that it may be modified within the scope of the appended claims.

What is claimed is:

1. A method for reprocessing a nuclear reactor element comprising an actinide, fission products, and a member of the group consisting of iron, nickel, chromium, molybdenum, tungsten, copper and tin after a period of service in a nuclear reactor, consisting essentially of making it the solid anode in an electrolytic cell with an acidic aqueous electrolyte and a mercury cathode, electrolyzing the element to cause it to dissolve and to reduce at the cathode the cations resulting from such dissolution of the members of the group, whereby they become commingled with the mercury, while the actinide values and substantially all the fission product values from the elements remain in the aqueous electrolyte.

2. The method of claim 1 where the electrolyte is 0.5 N in sulfuric acid.

3. The method of claim 1 where the reactor element comprises iron, nickel, chromium, molybdenum, tungsten, copper and tin.

4. The method of claim 1 where the reactor element which is made the anode has a cladding of stainless steel.

5. The method of claim 1 where the reactor element which is made the anode is an alloy of an actinide metal and stainless steel.

6. The method of claim 1 where the reactor element which is made the anode is a dispersion of an actinide oxide in stainless steel.

7. An apparatus for reprocessing reactor fuel elements, in the form of a modified upstanding hollow Y having a first arm in straight alignment with the base of the Y and a second arm making an obtuse angle with the base, means for holding reactor elements within said second arm and releasing them one at a time so as to fall by gravity into the base, a liquid permeable ionically conductive longitudinal plate within the base adapted to arrest the fall of a released reactor element above the bottom of the base, means for the admission of mercury into the base adjacent its bottom and means for permitting it to flow out the base at a level below the said liquid permeable plate, mercury between said bottom and said level, means for admitting aqueous electrolyte immediately above said level and means for permitting it to flow out of the base at a second level above said liquid permeable plate, electrolyte between said two levels, an electrically conductive piston at the lower end of an electrically conductive rod adapted to be lowered downward through said first arm into the base, an electrical circuit between said conductive rod and said mercury, and a power source within said circuit of sufficient size to electrolyze a reactor element immersed in said electrolyte within said base.

References Cited in the file of this patent

UNITED STATES PATENTS

| | | |
|---|---|---|
| 1,411,507 | Paulus | Apr. 4, 1922 |
| 2,226,784 | Sorensen | Dec. 31, 1940 |
| 2,328,665 | Munson | Sept. 7, 1943 |
| 2,776,184 | Kaman | Jan. 1, 1957 |
| 2,781,303 | Boyer et al. | Feb. 12, 1957 |
| 2,834,722 | McLaren et al. | May 13, 1958 |